June 2, 1953 — R. W. HAGGAR — 2,640,378
BORING HEAD CONSTRUCTION
Filed April 6, 1951 — 3 Sheets-Sheet 1

Inventor
ROBERT W. HAGGAR
by: Fetherstonhaugh & Co.
Attys.

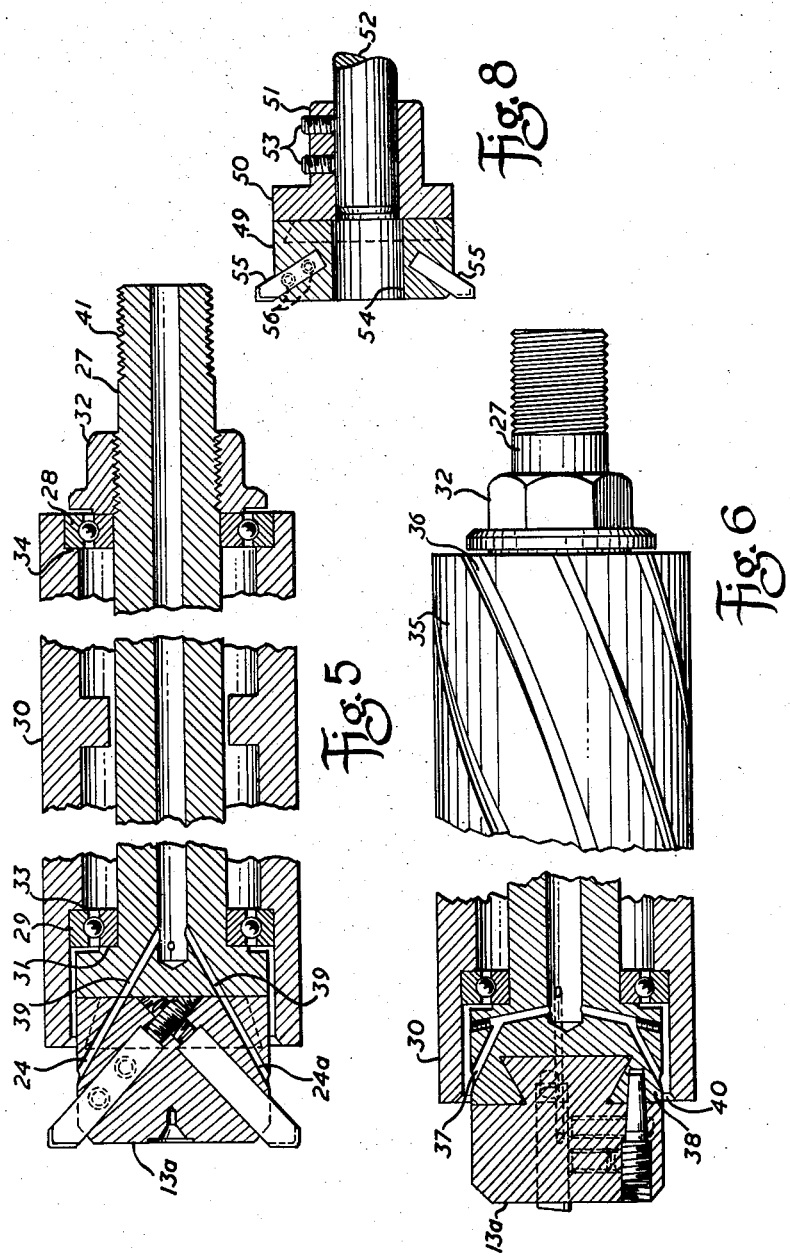

June 2, 1953  R. W. HAGGAR  2,640,378
BORING HEAD CONSTRUCTION
Filed April 6, 1951  3 Sheets-Sheet 3
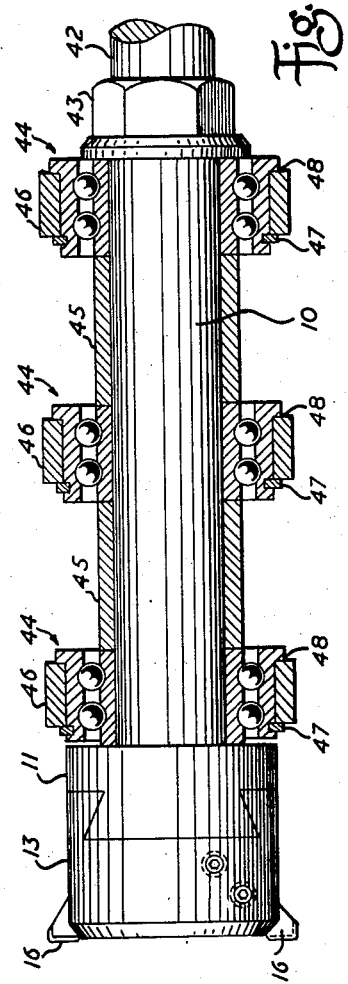
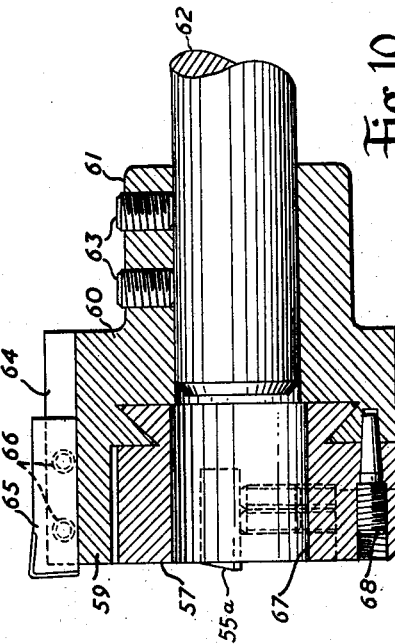
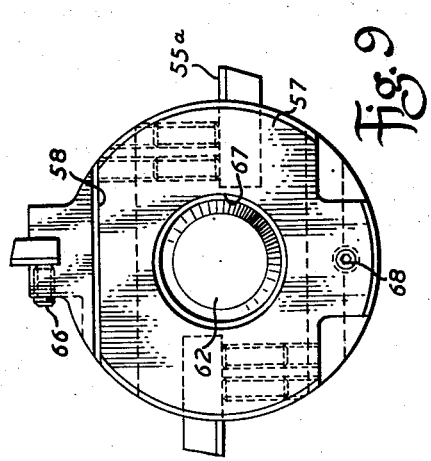
Inventor
ROBERT W. HAGGAR
by: Fetherstonhaugh & Co.
Attys.

Patented June 2, 1953

2,640,378

UNITED STATES PATENT OFFICE 2,640,378

BORING HEAD CONSTRUCTION

Robert W. Haggar, Hamilton, Ontario, Canada

Application April 6, 1951, Serial No. 219,560

9 Claims. (Cl. 77—58)

The present invention relates to an improved boring head construction adapted for boring or reaming operations.

In the manufacture of mechanical products, holes are sometimes rough bored, or finish bored to size by means of single point boring tools. These are usually held in suitable tool posts and are adjusted to their boring position by means of a transverse movement of the tool post. The above type is today seldom used in a mass production set-up.

The accepted method of boring or sizing holes today is by means of single, or multiple cutting tools, located in a suitable boring head or bar, and pre-set to size. These heads or bars are clamped in the turret of chucking lathes, or boring mills, or other types of suitable machines, and co-axial to the axis of the machine on which they are used. Consequently, holes can be bored accurately in successive pieces without adjustment to the boring head, or bar location.

Boring heads or bars of the above type are modified to suit blind hole boring or through hole boring.

In conventional blind hole boring, the front end of the bar is provided with an angular hole, or holes, or a diametral slot for the reception of single or multiple boring tools. The cutting edges of these tools project beyond the face of the boring head or bar, so that a blind hole can be bored to its full depth. This type is generally known as a stub bar, and can be used unpiloted (provided it is sufficiently rigid), or with an overhead pilot bar. It should be noted that pilots are provided for two main reasons: first, to eliminate tool chatter, and second, to correct errors in misalignment and to keep the boring tools cutting on a true axial course.

In the case of through hole boring, the boring bar is extended to allow its front end to pass through the work being bored, and to enter a bushing located truly in the front end of the machine spindle. This type is referred to as an axially piloted bar.

The usual tool head construction comprises a tool slot, or slots, cut through the boring bar diameter at a predetermined distance from its leading end, and to suit the length of the work piece being processed. Sometimes single or multiple boring tools are clamped in the tool slots, and set to size by trial and error on the job. In other cases, a tool holding block, ground to a slip fit in the boring bar slot, is used. This is provided with opposed boring tools, one in each side of the block, adjustably located in suitable slots. The tools in the block are preset to bore to the required dimension and the block is secured in the boring bar slot by means of a cone pointed screw through the bar, which engages a corresponding recess in the top of the tool block. It should be noted that the length of each opposed boring tool must be set equidistant from the centre of the tool block. Otherwise the hole will be bored oversize.

Axially piloted boring bars are also used for reaming holes to size. This is done by using a so-called floating tool. This can be in the form of a block as explained above. The opposed boring tools are ground on their ends, and set to the exact diameter of the hole to be reamed. In this case, the block is not secured by means of the cone pointed screw. It is free to slide in the boring bar slot and is centralized by equal pressure on the ends of the opposed boring tools.

Existing types of long piloted boring bars are inherently weak, and vibrate under heavy cutting pressure, and the problem is to mount the boring tools in such a way as to minimize and substantially avoid vibration. The present construction of a transverse slot through the boring bar, for locating a cutting tool holder or the cutting tool itself, further weakens the bar. In addition, the thickness of the cutting tools is limited by the slot that can be made through the bar, and when opposed tools are located in a block as described above their thickness or depth cannot be more than about one-half the thickness or depth of the block, and the block itself is limited in thickness by the size of the slot that can be cut transversely through the boring bar.

One adaptation of the boring head of the present invention is to eliminate the tool slot through the boring bar. Another object of the invention is to provide a construction suitable for boring and reaming large diameter holes.

A further object of the invention is to provide a boring head having back piloting means forming a part thereof and of a type which will avoid damage to the finish of the hole being bored.

Thus according to the present invention, I provide a boring tool in the form of a tool holding head of relatively large mass having a male dovetail slide mountable in a female dovetail slot cut diametrically across the front end of the boring tool shank. Simple locking means are provided for locking the tool head securely and concentrically to the shank for boring operations.

A release of such locking means permits the tool head to float in the boring tool shank for reaming purposes.

The invention will be appreciated in more detail by reference to the following specification taken in conjunction with the accompanying drawings.

In the drawings:

Figure 5 illustrates a combined fixed boring and floating reamer construction employing a boring head according to the invention.

Figure 6 is a further sectional view of the device of Figure 5 illustrating coolant supply passages according to the invention.

Figure 7 illustrates a modified form of combination fixed boring head and floating reamer having multiple guide bushings.

Figure 8 is a sectional view illustrating a modified form of seating member having a hollow shank.

Figure 9 illustrates a modification in the boring head and seating member to adapt it to semi-finish boring practice.

Figure 10 illustrates the boring head of Figure 9 in section in a modified form of seating member.

Figure 1:
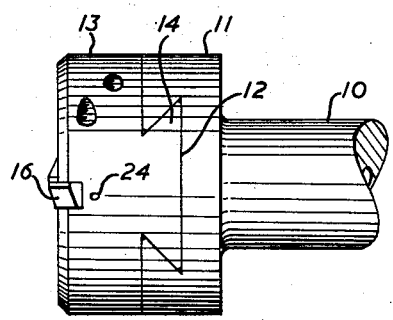
Figure 1 is a side elevation of a boring tool head according to the invention illustrating the manner of mounting same on the boring tool shank.
Figure 2:
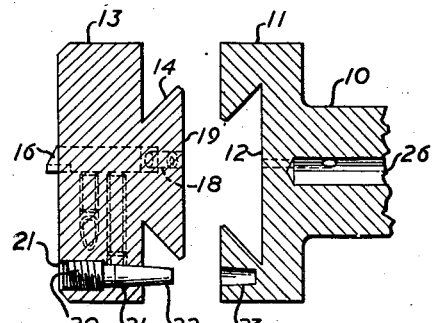
Figure 2 is an exploded sectional view of the components of Figure 1.
Figure 4:
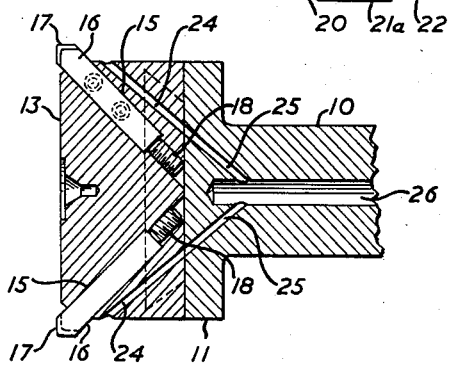
Figure 4 is view 4—4 of Figure 3.
Figure 3:
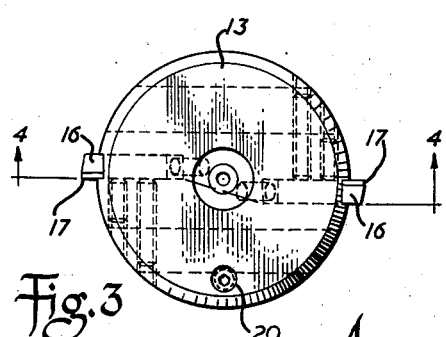
Figure 3 is a front end face view of the boring tool head of Figure 1.

The boring head illustrated in Figures 1 to 4 is particularly adapted to be used with an overhead pilot or as an unpiloted stub bar. The boring head shank 10 has an enlarged end 11 of relatively large diameter carrying a female dovetail slot 12. The enlarged end 11 serves as a seating or supporting member for the cylindrical boring head 13, the latter carrying a male dovetail slide 14 mountable within the female dovetail slot 12.

It should be observed that the seating member 11 is of a diameter corresponding to the diameter of the boring head 13 and, accordingly, it is capable of supporting it in a rigid manner in particular having regard to the advantages of a dovetail connection disclosed herein in respect to problems of vibration. Suitable holes 15 are provided in the boring head to accommodate conventional cutting tools 16 at the desired cutting angle. However, I prefer to mount the cutting tools in such manner that the cutting faces 17 thereof are arranged on a diametrical line and in this way facilitate adjustment thereof. The cutting tools 16 are adjusted by means of the adjusting screws 18 accessible from the base of the head in the end face 19 of the male dovetail slide.

The boring head is of relatively large mass as compared with the mass of the cutting tools therein and is locked in the seating member by means of a locking screw 20 set in the threaded bore 21 terminating in tapered bore 21a of the boring head and extending to present the taper or locking head 22 thereof for engagement in the socket 23 formed in the seating member. As indicated I prefer to employ an extended tapered head and continuous socket arrangement in both locked parts for the necessary locking function. When the locking screw is tightly set the tool head is held rigidly and symmetrically with the shank 10 for fixed single or opposed, tool boring.

In use, I may employ a boring head of this type with a two inch diameter tool head to bore or ream holes from two and one-eighth to three and one-eighth inches. A larger tool head may be employed such as a three inch diameter to increase the range to four and one-eighth inches, this all being capable of accomplishment with the same seating member and shank, the seating member being of a two inch diameter.

In normal use the shank may be provided with three tool heads, one of which may be in use and the other two being pre-set and ready for use. No setting of the cutting tools is required to be done by the operator, for when the tools of the boring head in use become dulled it is only necessary to back off the locking screw 20 and replace the boring head with one which is ready for use. This operation takes less than a minute to perform and thus materially reduces set-up time as compared with conventional head setting requirements. The boring head design illustrated in Figures 1 to 4 employs a conventional coolant vent system comprising the passages 24 and 25 in the head and seating member respectively, connecting to an axial coolant passage 26 in the shank 10.

In Figures 5 and 6 I illustrate a combination fixed boring and floating reamer of my invention wherein like numerals indicate like parts. In this case, however, the boring head shank 27 is finished to a diameter to receive bearings 28 and 29 supporting a guide bushing 30. The bearings are preferably of a heavy duty shielded thrust type. The bearing 29 is seated against the shoulder 31 on the shank, the bearing 28 being held in place by the flanged lock nut 32. Inward projections 33 and 34 of the guide bushing 30 serve to form a rigid thrust assembly of the guide bushing with the bearings.

The guide bushing 30 is machined in its outer surfaces 35 for a sliding fit in the hole to be bored or reamed. Preferably left-hand spiral flutes 36 are provided to reduce sliding resistance of the guide bushing.

In the boring of a gun barrel, for example, the guide bushing will follow the rotation of the barrel during the boring operation and is subjected only to sliding wear as it rotates at work speed, thus avoiding rotary abrasive action. In this form of combination tool I provide a second set of coolant passages 37 in the boring head seating member 38. A primary set of coolant passages 39 is of conventional arrangement and feeds the passages 24a of the boring head 13a. The coolant passages 37, however, cause coolant to project from the front end of the guide bushing 30 in the region of the annular clearance opening 40 whereby the bore being cleared is washed and the bore surface is maintained clean in advance of the guide bushing as the latter passes therethrough.

The assembly of the combination tool illustrated in Figures 5 and 6 comprises the steps of first seating the boring head in the seating member of the shank and locking the head if desired according to whether a bore or reaming surface is to be effected. The bearing 29 is then placed in the guide bushing and locked in place by afterwards applying the bearing 28 and locking flanged lock nut 32. The back end of the shank 27 is threaded as at 41 to suit a universal coupling, or may be screwed directly to the boring bar for an integral set-up.

In some applications I may prefer to form the guide bushing in plural form in the manner illustrated in Figure 7. This may be done when using a tool head 13, seating member 11 and boring head shank 10 of the type illustrated in Figures 1 to 3. The shank 10 may be reduced in diameter rearwardly as in the region 42 and carry threads to accept a locking nut 43 adapted to maintain a series of thrust bearings 44 in fixed spaced relationship by means of the sleeve spacers 45 on the shank 10. The outer races of the bearings preferably carry bronze pilot rings 46 retained thereon by means of a split ring 47 against the shoulder 48 thereof. I have found that the multiple bushing arrangement can be adapted for the boring of gun barrels of larger caliber with more facility than the single bushing of relatively large axial dimension.

In the form illustrated in Figure 8 the tool head 49 is mounted in a seating member 50 comprised of a cast body having a hollow shank portion 51 adapted to directly receive a boring bar 52. The shank portion 51 is fastened to the boring bar by means of set screws 53 or by a slidable keyway locating on a key on the bar (not shown) for heavy work as in the boring of heavy caliber guns. The tool head 49 is similar to the tool head 13 of Figure 1 but has an enlarged bore 54 therethrough to allow freedom thereof for reaming purposes where the boring bar is in the projected position and passing therethrough. In this case, therefore, the cutting tools 55 are necessarily manually adjustable in their extent and are held in the conventional manner by locking screws 56 holding the same within suitable square bores in the head.

It will be appreciated that with the modified form of construction illustrated in Figure 8 the tool head may be located anywhere along the length of the boring bar. The arrangement, therefore, may be used for blind hole boring or the boring bar may project forwardly of the tool head and be piloted by means of a pilot bush located in the front end of the machine spindle.

A still further modification is illustrated in Figures 9 and 10 wherein the tool head 57 similar to that illustrated in Figure 8 is cut away as at 58 to accommodate a forwardly projecting and leading semi-finishing tool support 59 extending from integral formation with the seating member 60. The seating member may otherwise be of the type illustrated in any of the foregoing figures, but is shown in that modification carrying a hollow shank 61 adapted to be fastened to a boring bar 62 by means of set screws 63. The forwardly projecting semi-finishing tool support 59 is slotted as at 64 to provide a tool slide into which a semi-finishing tool 65 is inserted and locked at the desired adjustment by means of locking screws 66. It should be observed that the tool head 57 has an enlarged bore 67 to allow it to float though the bar 62 projects therethrough when reaming. The tool head may be located and secured in the seating member for boring by means of the locking screw 68 in the manner previously described.

The boring device illustrated in Figures 9 and 10 is particularly adaptable for the semi-finish boring and reaming of large valves, housings, motor and generator field frames and the like in one operation, and is equally efficient when used on large chucking lathes, vertical boring mills, or in cases where either the head or the work rotates. In operation the tool 65 leads the boring or reaming cutters 55a to semi-finish the bore and to reduce the load on the following cutters. As previously noted, about one-half of the conical seating for the locking screw exists in the tool head and receiving member. The bore 21a and socket 23 are formed simultaneously with the head clamped truly concentric with the seating member. The tapered shank or locking head of the locking screw is then formed to mate with the bore 21a and socket 23 and constitutes an integral part of the screw 20.

I have found that the characteristics of the boring head of my invention are such as to lead to marked degree of self-centering action when reaming, and better accuracy in boring by reason of the clamping feature of the taper locking screw. The use of back piloting guide bushings as proposed herein speeds up the rate of boring or reaming and assures a truly concentric bore and the washing action of the coolant avoids damage to the bore by chip particles.

It is intended that the present disclosure should not be construed in any limiting sense other than that indicated by the scope of the following claims:

What I claim as my invention is:

1. A boring head comprising in combination: A tool head, two opposed independent cutting tools mounted in said head, a male dovetail piece at the base of said tool head, a seating member having a shank portion, a female dovetail slot in said seating member extending transversely of the longitudinal axis of the shank thereof and adapted to slidably receive said male dovetail piece to mount the tool head thereon, and locking means for locating said tool head concentrically with said shank and fixing said head against sliding movement in the transverse sliding direction of said dovetail piece in said seating member.

2. A boring head as claimed in claim 1 in which said locking means are releasable to allow predetermined sliding movement of said tool head relative to said seating member and transversely of the longitudinal axis of the latter to provide a floating action of said tool head in reaming operations.

3. A boring head as claimed in claim 1 in which the shank of the seating member is bored to receive a boring bar, and an enlarged bore in said tool head designed to freely accommodate a boring bar therethrough.

4. A boring head as claimed in claim 1 wherein the tool head is of a diameter not less than the diameter of the seating member.

5. A boring head as claimed in claim 1, and a guide bushing of generally cylindrical form extending about said shank of a diameter substantially corresponding to the diameter of the bore to be worked upon and ball bearing means supporting said guide bushing on said shank for relative rotation therewith.

6. A boring head as claimed in claim 1, and a guide bushing of generally cylindrical form extending about said shank of a diameter substantially corresponding to the diameter of the bore to be worked upon, ball bearing means supporting said guide bushing on said shank for relative rotation therewith, a coolant passage in said shank extending axially thereof, and coolant passages in said seating member communicating with said axial passage and disposed to direct coolant laterally thereof.

7. A boring head as claimed in claim 1, a finishing tool supported on said seating member projecting forwardly thereof, and a cut away portion on said tool head designed for clearance with said finishing tool support.

8. A boring head as claimed in claim 1, and a guide bushing of generally cylindrical form extending about said shank of a diameter substantially corresponding to the diameter of the bore to be worked upon, ball bearing means supporting said guide bushing on said shank for relative rotation therewith, and means on said guide bushing forming a part thereof and projecting to partially overlie said tool head but freely spaced from the latter.

9. A boring head as claimed in claim 1, and a plurality of guide bushings each of a diameter substantially corresponding to the diameter of the bore to be worked upon, bearing means supporting each guide bushing on said shank, and separating collars on said shank extending between said bearings to provide a predetermined spacing for said bushings.

ROBERT W. HAGGAR.

References Cited in the file of this patent

UNITED STATES PATENTS

| Number | Name | Date |
|---|---|---|
| 92,365 | Strong | July 6, 1869 |
| 1,341,565 | Krepps | May 25, 1920 |
| 1,746,716 | Sasse | Feb. 11, 1930 |
| 2,115,319 | Roye | Apr. 26, 1938 |
| 2,211,596 | Darash | Aug. 13, 1940 |
| 2,283,497 | Fields et al. | May 19, 1942 |